Feb. 18, 1941.        A. C. PETERSON        2,232,011
AUTOMATIC PRESELECTIVE POWER ACTUATED GEAR SHIFTING MEANS
Filed Feb. 10, 1937        2 Sheets-Sheet 2
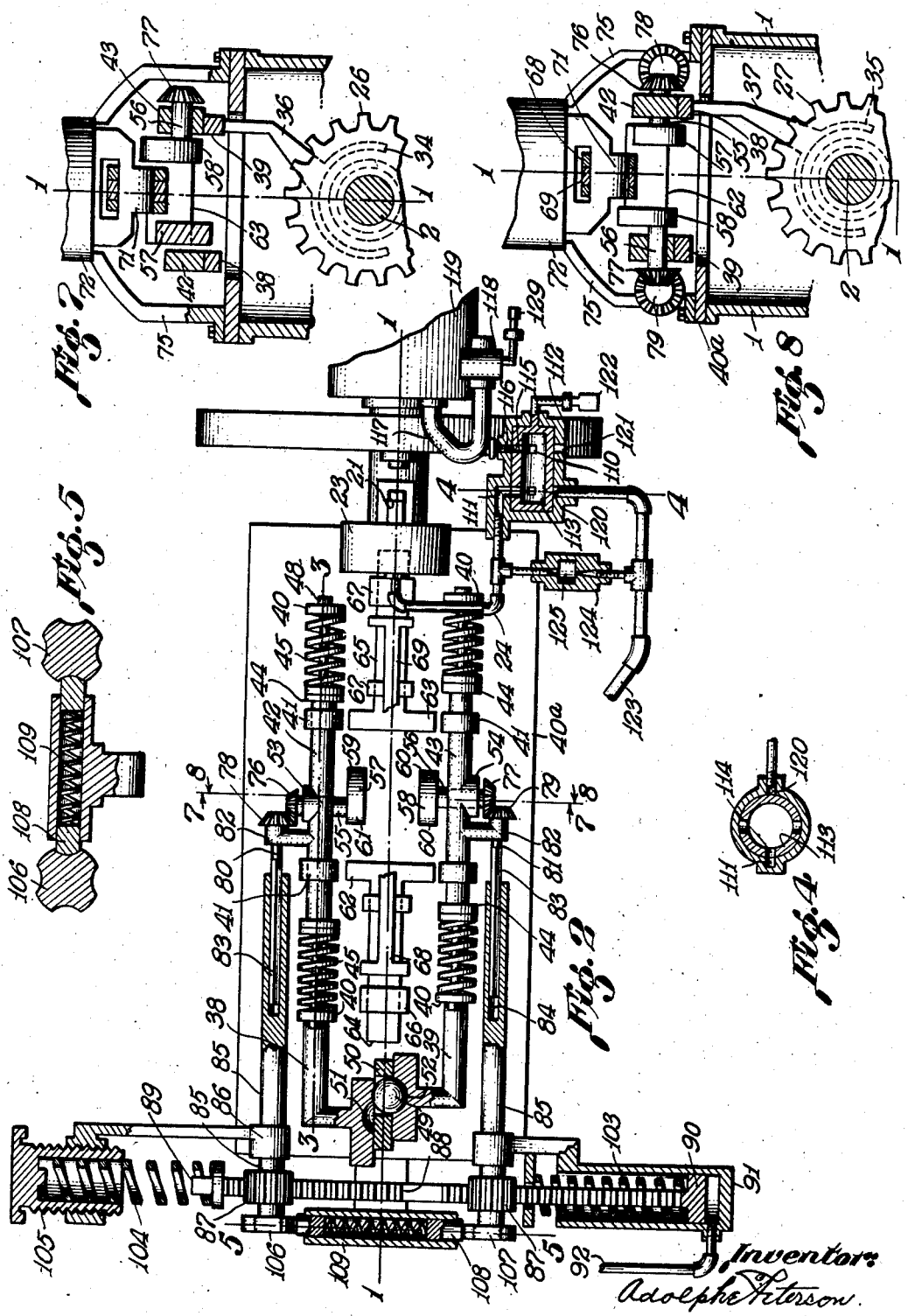
Inventor:
Adolph Peterson Patented Feb. 18, 1941

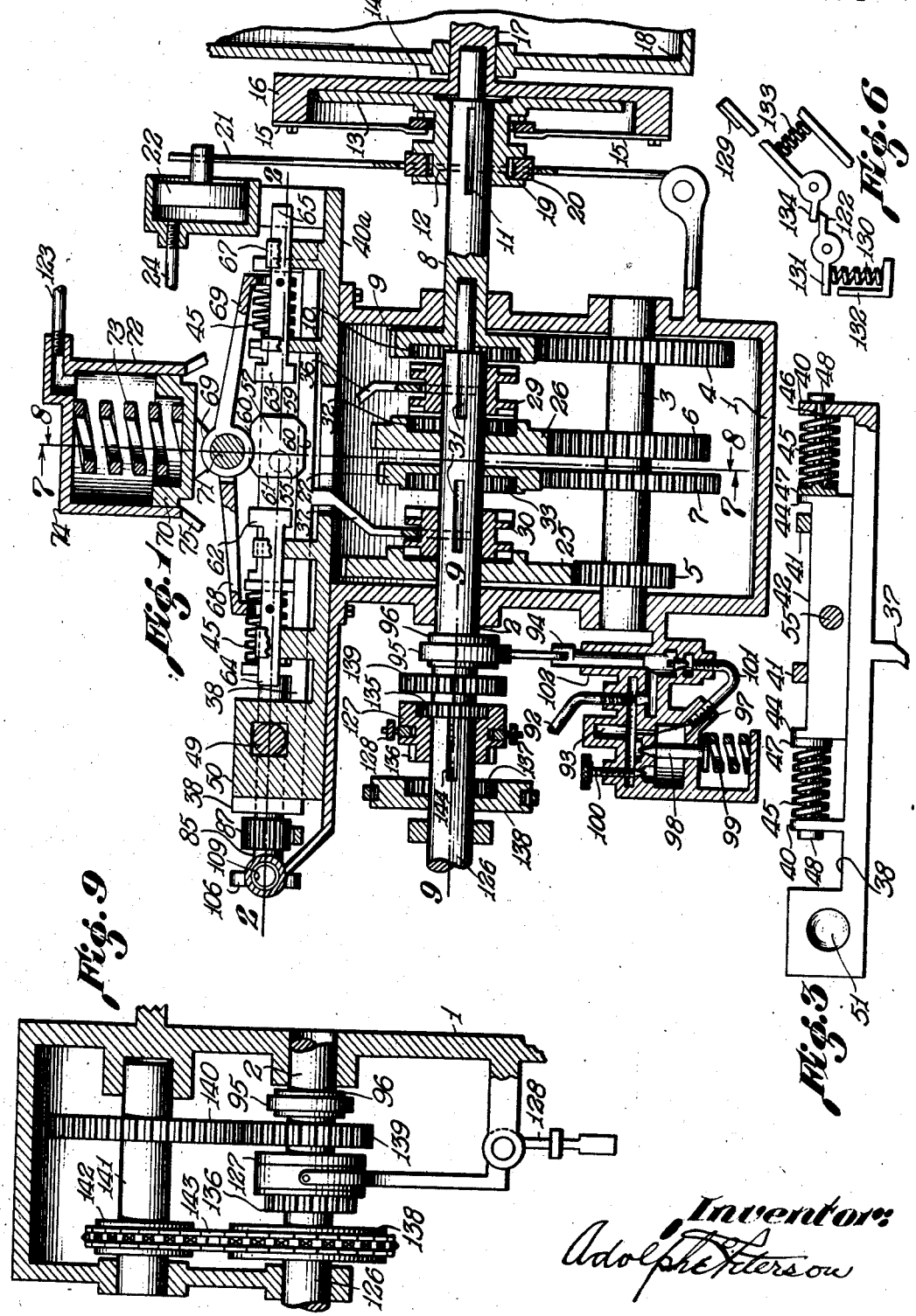

2,232,011

UNITED STATES PATENT OFFICE 2,232,011

AUTOMATIC PRESELECTIVE POWER ACTUATED GEAR SHIFTING MEANS

Adolphe C. Peterson, Minneapolis, Minn.

Application February 10, 1937, Serial No. 125,006

23 Claims. (Cl. 74—472)

My invention relates to automotive transmission devices and particularly to a form of shifting device which is automatic in preselection wherefore it is called automatic preselective power actuated gear shifting means.

The principal objects of my invention are to provide an automotive transmission means which shall be simple in construction and in the form commonly used for the gear elements, while at the same time having provision for the power operation of shifting and the preselection of the shifting action. An object is to provide a shifting means for any of the usual forms of automotive gear transmission, which shifting means shall be simple in construction, power actuated, durable in use, and reliable in actuation. An object is to provide a form of shifting means which shall be capable of actuation without more than a single pressure responsive piston actuation means, while at the same time capable of actuation of several gear shifting elements. An object is to provide a form of shifting means which shall provide a proper sequence of operation of power declutching, and power shifting of the gear elements, and which shall be reliable in such operation. An object is to provide a form of gear shifting variable engaging means which shall be capable of assembling with the cover plate of any commonly used transmission means and which shall form a simple and cheaply constructed assembly for the uses described. An object is to provide a form of gear shifting means wherein the shifting elements are automatically maintained variably according to speed in the correct position at any time for actuation to effect the proper gear engagement upon mere initiation of that operation. An object is therefore to provide a form of gear shifting and gear means wherein the elements are responsive to the speed variation of the vehicle and thus maintained variably in position for quick response to and quick effectuation of a gear shifting initiation movement or operation.

The principal devices and combinations of devices comprising my invention are as hereinafter described and as defined in the claims. In the accompanying drawings which illustrate my invention in several different forms, like characters refer to like parts throughout the several views.

Referring to the drawings:

Fig. 1 is a view chiefly in vertical section through the axes of the principal operating shafts and elements of my device, this view being a section on the line 1—1 of Fig. 2, and of Figs. 7 and 8.

Fig. 2 is a plan view of the device shown in Fig. 1 some parts being shown broken away and some parts being shown in horizontal section on the two-plane line 2—2 of Fig. 1, the parts 72, 71, and the ends of members 68, 69 pivoted on 71 being omitted in this view so as to permit more clear depiction of the parts therebeneath.

Fig. 3 is a detail view of the shifting bars on one side, some parts being in section on the line 3—3 of Fig. 2.

Fig. 4 is a detail section through the control valve on the line 4—4 of the latter as shown in Fig. 2.

Fig. 5 is a vertical detail section taken on the line 5—5 of Fig. 2.

Fig. 6 is a detail view of a modified form of co-acting means for the accelerator lever or pedal and the shift control valve. This form is preferably used with the form as shown in the other figures but is separately shown for the sake of simplicity of the drawings in the other figures.

Figure 7 is a transverse section on the line 7—7 of Fig. 2 and Fig. 1 and looking to the right from that plane, showing the parts 72 and 71 in elevation forwardly of that plane and the parts 63, 26, 75, 36 behind that plane.

Fig. 8 is a transverse section on the line 8—8 of Fig. 2 and Fig. 1, this being the same line as line 7—7, but this view is looking toward the left from that plane, showing the parts 72, 71 in elevation forwardly of that plane, and the parts 62, 37, 27, and opposite parts 75 behind that plane.

Fig. 9 is a horizontal section of a detail on the line 9—9 of Fig. 1 this detail showing the reverse clutching and driving means between the driven shaft 2 and final drive shaft 126.

Referring again to the drawings, Figures 1 to 4 inclusive, this embodiment of my invention, as here shown, is as illustrated incorporated with the positively or permanently engaged gears having individual clutching elements for the pairs of gear elements or gear trains, but it is here to be especially noted that I contemplate that my invention and gear shifting or control means may be used with a transmission which has shiftable gears for engaging the other gears, instead of the permanently engaged gears, and gear clutches. The shifting and control means described may be used in connection with either form of gear transmission and the claims to cover my device are intended to be so drawn and to have such interpretation that they will cover my device for use with either of such forms of gear transmission.

In the figures mentioned, the numeral 1 indicates a gear case, 2 driven shaft or propeller shaft or element, 3 a secondary shaft having spur gears or herringbone gears 4, 5, 6, 7 integrally formed therewith or securely attached thereto, 8 a primary or driving shaft having integrally formed therewith a primary drive gear 9 and within that drive gear an internal tooth clutch 10. The driven shaft 2, secondary shaft 3 and primary driving shaft 8 are rotatably mounted in the gear case 1, the driven shaft and primary shaft being mounted to revolve on the same axis extended therethrough.

The primary drive shaft has at its forward end or one end coaxial with it a clutch plate collar 12 shiftable on the primary driving shaft and driving it by means of coacting teeth and groove 11 and the clutch plate collar 12 has integrally constructed with it the clutch plate 13, which when pressed against the fly-wheel plate 14 by the springs 15 of the fly-wheel 16 will clutch the primary drive shaft 8 to the fly-wheel 16 and thereby to the engine crank shaft 17 which is incorporated in the engine 18 shown only by its end broken away, the engine being shown diagrammatically only.

The clutch plate collar 12 is by the collars 19, ring 20, and lever 21 withdrawn, thereby withdrawing the clutch plate 13, whenever the lever 21 is drawn by the piston 22. The piston 22 is reciprocable through a short movement in the vacuum cylinder 23, the interior of the latter having connection by conduit 24 with the control apparatus hereinafter described.

The driven shaft 2 has revolvably mounted thereon three spur or herring bone gears 25, 26, 27 respectively, and they are respectively in permanent engagement with the gears 5, 6, 7. The primary drive gear 9 is in permanent engagement with the spur gear 4 and thereby the secondary shaft 3 is in permanent operable engagement through the gears 4, 9 with the primary drive shaft 8 and thereby with the clutch plate 13.

The driven shaft 2 has in permanent rotatable engagement therewith the double ended dog-clutches 29 and 30, each having inwardly projecting dogs or teeth by which they are engaged by a groove 31 in the driven shaft 2. The dog-clutch 29 when shifted one way engages with the internal gear or teeth in the primary drive gear 9 and when shifted the other way engages with the internal gear or teeth 32 in the gear 26. The dog clutch 30 when shifted one way engages with the internal teeth or gear 33 in the spur gear 27 and when shifted the other way engages with the internal gear or teeth in the spur gear 25. The dog-clutches 29 and 30 are respectively axially movable by the semi-circular collars 34 and 35, which act between the collars as shown on the dog-clutches, and the semi-circular collars 34, 35 are respectively secured to or formed integrally with the levers 36, 37 the latter of which is integrally formed with the shifter bar 38 and the other of which is integrally formed with the shifter bar 39, the levers 36-37 each depending downwardly into the transmission case 1 and the shifter bars 38, 39 being mounted horizontally and slidably on the top of the cover plate 40a the guides 41 being secured down upon them on the cover plate 40a by any means. The shifter bars 38-39 are slidable or reciprocable with their levers 36, 37 in a direction parallel with the axes of the driven shaft and the other shafts.

The shifter bars 38, 39, each have on each of its ends, vertical shoulders or lugs 40. Each shifter bar 38 and 39 has mounted immediately above it and slidable upon its upper face and within the guides 41 and centrally between the shoulders 40 of the shifter bar actuator bars 42 and 43 respectively, one for each shifter bar, and each of these actuator bars has on each of its ends a shoulder or lug 44 extending vertically about the same distance as the shoulders 40 extend. Between each of the shoulders 40 and its opposite or related shoulder 44 of an actuator bar there is placed a coil spring 45 and the coil spring has free movement in the direction of its contraction but is limited against more than a certain expansion by a limiter element 46 which extends through the coil spring and at one end has a shoulder 47 and at the other has the shoulder 48.

Thus each actuator bar 42 and 43 is stationed on a shifter bar 38 or 39 and at its ends has a shoulder which abuts against the related coil spring 45 and the latter abuts against the related shoulder of a shifter bar 38 or 39, so that a movement of an actuator bar 42 or 43 either way from a normal position relative to the shifter bar against a coil spring 45 will create a tension in the coil spring which will tend to move the related or associated shifter bar 38 or 39 in the same direction as soon as the shifter bar is released or permitted to assume that movement, the shifter bars 38 and 39 being interlocked by a ball 49 which being held by the stationary standard 50 and located in a socket therein will move either into a depression 51 or 52 in the respective shifter bars 38 or 39.

Each actuator bar 42 and 43 has centrally of its length a bearing mounting 53 and 54, respectively, wherein is rotatably mounted on a horizontal axis a pivot-pin 55, 56 respectively, and the latter bear fixed thereto, respectively, so-called interceptors 57, 58 respectively, each of the latter having, so-called extreme face 59, two opposite mid-distance faces 60, and an alternate face 61, which latter is much retracted toward the axial center, that is is only a short distance from the axis of the pivot-pin, by which the interceptor is mounted. Each interceptor with its faces thus constitutes a cam-like member. The interceptors or interceptor cams as they may be called, are stationed substantially opposite each other (or its position) when either is in a mid or normal position, and they are located between interceptor contactors 62 and 63, respectively.

The interceptor contactors 62 and 63 are respectively forced on the near ends of two primary actuators 64 and 65, respectively, which are stationed, one on either side of the position of the interceptors, and each of which is horizontally movable parallel to the movement of the shifter bars 38—39, in guides 66, 67, respectively. The primary actuator 64 has pivotably attached to it the link or connecting rod 68 and the primary actuator 65 has attached pivotably thereto the link or connecting rod 69. The movement of the primary actuators is opposite in direction at all times, and as they are withdrawn they are withdrawn from a central common focal point, which is normal position of the axis of either of the interceptors, and as they are moved in the opposite directions they move simultaneously into the contacting or actuation positions and they are then moving toward that same central point, which is the normal axis of either interceptor. The shifter bars, actuator bars and primary actuators all move substantially parallel to each other and substantially in the same plane or nearly the same plane.

The two primary actuators 64, 65 thus have a converging or actuating movement toward each other and they have oppositely a retroacting or separating movement away from each other which is a so-called releasing or withdrawing movement. The converging or actuation movements of the two primary actuators is induced by a vertically reciprocable actuator piston 70 to which the inner or near ends of the links 68 and 69 are pivotably connected by the pivot 71, horizontally mounted in the piston 70, on the latter's under side. The converging movement is induced by vacuum on the upper side of the actuator piston 70 (pressure responsive piston) in the cylinder 72, and the withdrawing or releasing movement of the primary actuators is induced by a coil spring 73 acting on the upper side of the actuator piston 70 between it and the upper end 74 of the cylinder 72. The strength of the coil spring 73 need only be sufficient to move the piston and thus move the primary actuators away from the converged or actuating positions. The inner end of one connecting link is forked as shown to assist in mounting of the links on the pivot 71. The cylinder 72 is mounted by posts 75 on the cover plate 40a.

The interceptors have fixed on the opposite ends of their pivot pins 55 or 56 mitre gears 76, 77, respectively, which are, respectively in permanent cooperation with mitre gears 78, 79 mounted respectively on the ends of rods 80, 81, the latter rotatably mounted in brackets 82, and each having on its opposite end a square portion 83 which may move axially within a square bore 84 in either of the rotatable members 85. The rotatable members 85 are mounted rotatably in the brackets 86 on the cover plate 40a and have on their opposite ends the small spur gears 87, which are each of them in cooperation with a toothed rack or racks 88 on the upper side of the rack bar 89, the latter fixed to the pressure responsive piston 90. The pressure responsive piston 90 is reciprocable in the cylinder 91 and the latter may receive or discharge liquid oil by way of conduit 92, the latter being in connection with the small equalizer chamber 93 which receives liquid oil as pumped by pump plunger 94, when the latter is reciprocated by eccentric rod 95, and eccentric 96 on driven shaft or element 2.

The equalizer chamber 93 may discharge permanently through a small constantly open port 97, and may discharge under extreme pressures through port controlled by valve 98 and spring 99 the latter normally closing the valve on the port, and may also discharge through another small port to the extent that the latter is opened by needle valve 100, all of these discharges passing to the return or by-pass pipe 101 on the suction side of the pump cylinder 102.

The rack bar 89 is constantly held against movement by the liquid pressure in the cylinder 91 by coil spring 103 but may also have additional spring pressure or restraint imposed yieldably on that movement by a supplementary coil spring 104 if the latter is compressed by the hand screw nut or adjustment means 105. Thus the pressure responsive piston 90 if pressure of oil accumulates may progressively move the rack bar 89 against the pressure of spring 103 (and spring 104 if compressed) and thereby rotate in steps the spur gears 87 and thereby rods 80—81 and pivot pins 55, 56 and interceptors 57, 58 and the latter will be simultaneously and uniformly rotated or partially rotated at any time and this rotation will be in steps as controlled by the small cam wheels 106—107, respectively on the extreme rear ends of the rotatable members 85, balls 108 being pressed by a coil spring 109 against the cam wheels 106—107. The latter have depressions or dips in their faces to procure a stepped action of the rack bar and thus a stepped rotation of the interceptors 57, 58.

The cylinder 23 is by conduit 24 connected with a port 111 in control cylinder 112 and the port is controlled by control valve 113 and port 114 therein, and port 115 in the control valve therein may connect through port 116 with the inlet manifold 117 of carburetor and throttle unit 118 and cylinder block 119 of engine 18. The control valve when that connection is formed closes ports 120 and 121, but in the opposite position of the control valve as fixed by manual lever 122 moves port 110 to open the control valve to atmosphere and closes the connection with inlet manifold 117 and opens connection conduit 123 to control valve and thus to atmosphere. The connection conduit 123 connects directly with cylinder 72. A by-pass 124 which has a small vent nozzle or aperture 125 permits flow in restricted volume from conduit 123 to conduit 24.

The driven shaft 2 may be disconnected or connected with final drive shaft 126 by a dog-clutch 127 controlled by hand lever 128. The dog-clutch 127 at its right end has an internal gear or teeth which may engage small spur wheel 135 as a clutch for forward driving thereby connecting driven shaft 2 directly with final drive shaft 126. When dog-clutch 127 is moved by hand lever 128 to its most rearward or leftward position, it is disconnected from spur wheel 135 and driven shaft 2 but is engaged by clutch teeth 136 with the internal gear or teeth 137 in sprocket wheel 138. When so connected the drive from driven shaft 2 is through the spur gear 139 to spur gear 140, thence by shaft 141, sprocket wheel 142, sprocket chain 143 to sprocket wheel 138 and thereby to final drive shaft 126, to which the sprocket wheel 138 is permanently connected. The dog-clutch 127 is engaged by tooth and groove 144 with final drive shaft 126 but so that it may slide axially to the engaging positions. In the neutral position of dog-clutch 127 neither drive is engaged, that is neither forward nor reverse. The driven shaft 2 is disconnected from final drive shaft 126 at approximately the position of the spur wheel 135.

In the operation or use of my device, the operator may disconnect driven shaft 2 from final drive shaft 126 by the dog clutch 127, controlled by the hand lever 128, and when he desires to move his car forwardly he first starts the engine shaft 17 by any known means and he then connects driven shaft 2 with final drive shaft 126 by dog-clutch 127, and he may then move the throttle lever or pedal 129 of the carburetor to increase the engine speed, and at the same time he may rotate control valve 113 by lever 122 to place pipes 24 and 123 in communication with atmosphere and cut off from the inlet manifold 117 and thereupon atmospheric air may flow into cylinders 23 and 72 and the pistons therein may move outwardly in their cylinders to positions shown in Figure 1 and by this movement the primary actuators are moved away from their interceptors 57, 58 and the piston 22 permits the main clutch plate 13 to engage, the engine will then drive through the main clutch 13, the gear 9, the secondary shaft 3, the spur gear 5, the spur gear 25 to the driven shaft 2. This will be the situation or engagement since, in starting a car, the pressure responsive piston 90 will be withdrawn into its cylinder by the springs as there will be no pressure in the cylinder 91, and the operator has by his prior action, as above stated, insured that the gear controlling means has operated to place the spur gears 5 and 25 into the driving cooperation with shafts 2 and 8 through spur gears 4 and 9.

The drive will proceed as indicated, which is drive by the lowest ratio of the rotation of driven shaft 2 to primary drive shaft 8 and so proceeding as the car picks up speed the pressure in cylinder 91 will increase and when the speed is say about ten miles per hour more or less as determined, the rack bar 89 will move to rotate interceptors 57, 58 to the next position (ninety degrees around) of their rotation, and in this position the interceptors will be stationed in the position so that when operator releases the accelerator pedal or throttle lever 129 to idling position and moves control valve lever 122 to rotate control valve 113 to the position where vacuum from inlet manifold 117 will be effective through the control valve upon the pistons in cylinders 23 and 72 thereupon clutch plate 13 will first be released and immediately thereafter the piston 70 will draw the primary actuators into the position converging on the interceptors 57, 58 and by this movement the actuator bars will be moved into new positions, so that the first shifter bar 38 will move to neutral and thereupon, released by the interlocking means, the shifter bar 39 will move to position of engagement of spur gear 26 by clutch 29, and thus second speed will be engaged, and the operator by again shifting control valve, permits atmospheric air to flow into cylinders 23 and 72 and the main clutch is engaged and primary actuators 64 and 65 withdrawn from interceptors 57, 58. As speed again picks up, at say fifteen miles per hour the interceptors 57, 58 will be rotated simultaneously to their next position (ninety degrees ahead) and will be ready for next gear change, when the operator desires it, and he may secure this change, by the same movements of the control levers 129 and 122, as before and thereupon, shifter bar 39 will be moved back to neutral and shifter bar 38 will move dog-clutch 30 to engage the spur gear 27 and the drive will proceed through spur gears 9—4 and 7—27. If the car speed should further increase to say twenty miles per hour, the interceptors will automatically take the next stepped position and will be ready for the engagement actuation whenever the operator desires to effect such actuation, and, the interceptors having taken such new position, for the change to highest or direct speed engagement, the operator may cause this speed to be engaged, as he caused the other engagements to be made, by similar movements of control levers 129 and 122, as before, and thereupon, shifter bar 38 will be moved back to neutral, and the shifter bar 39 will be moved to engage the internal tooth clutch 10 by dog-clutch 29, so that direct drive is thus engaged.

If now the operator desires to stop his car, he permits the throttle lever 129 to close, and brakes the car, and the engine still running to create vacuum he again places control lever 122 to connect the vacuum with cylinders 23 and 72 and thus causes the shift to lowest gear speed engagement, the interceptors having taken position automatically for this engagement, and he may then stop the engine, and disconnect the drive shafts by clutch 127. The latter is used only to go from stop to travel or reverse control.

The interoperation of the primary actuators and the interceptors and shifter bars is more specifically described as follows: In this description it should be especially understood that each shifter arm or yoke lever 36 or 37 is substantially a unit with its associated shifter bar 38 or 39, its actuator bar 42 or 43 and interceptor or interceptor cam 57 or 58. The movement of this shifter unit as such is induced by the primary actuators 64 and 65 but the latter are not mechanically connected in any manner with the shifter units, composed of the shifter arms or yoke levers and their associated parts, except that the primary actuators by their members 62—63 contact the interceptors in their contracted positions.

The shifting movement is accomplished by the action of the actuator bar 42 or 43 against its shifter bar 38 or 39 through the associated coil springs 45. Either actuator bar 42 or 43 is placed in the position whereby it will cause movement of the shifter bar associated by compression of its coil springs 45, but that movement is not delayed any longer than the period of time necessary to place the other shifter bar (if out of neutral) into its neutral position so that the shifter bar for actuation is unlocked for that movement. If the arrangement of gears should be such that either shifter bar might slide its related gear clutch from one position to its opposite position for engagement (as they might be arranged) then there would be no apparent delay as the compression of a coil spring would immediately cause movement of the associated shifter bar so as to cause the next engagement. That is the movement of a shifter bar by and with its actuator bar 42 or 43 is dependent only on the locking member 49 in its delay, and that locking action alone prevents movement of a shifter bar and associated actuator bar in unison or as a moving unit. Thus whenever a primary actuator has moved an actuator bar out of neutral position the associated shifter bar with its shifter arm or yoke lever is moved with it to its engagement position, and having been so moved it will stay in that engagement position until the actuator bar 42 or 43 is again thrust out of that position by an actuation movement of a primary actuator. This follows since the coil springs 45 which cause the inter-associated movement of shifter bar and actuator bar are compressed between brackets or arms fixed on the shifter bar and actuator bar and the compression of the coil springs 45 is thus dependent only on the relative position of the shifter bar and actuator bar and the coil springs 45 associated as a pair with one shifter bar are held in a balance by the limiter 46—47—48. The limiter action is such that each actuator bar is always yieldably held in the exact mid-position between the shoulders 40 of the shifter bar, and compression either way of the coil spring 45 at either end will cause movement to again effect that position relatively as soon as the unlocking action is completed, if the position of the other shifter bar should be out of the neutral position.

Bearing in mind that the shifter bar with its associated actuator bar is normally independent of the primary actuators, the converging or actuation movement of the primary actuators becomes effective according to the condition or positions of the interceptors 57 and 58. The normal or inactive position of either of these interceptors is a position such as that shown by the interceptor 58 in Fig. 2, where the mid-distance sides or faces of the interceptor are opposite the members 62—63 that is in line with them, this position having been attained by the rotation of the interceptor to that position. The interceptor 57 is in Fig. 2 (and also in Fig. 1) shown in the active position, that is with its extreme or most distant radial face in line with the primary actuators and toward the member 63 so that in a previous actuating movement the member 63 has contacted interceptor 57 and moved it with its actuator bar 42 leftwardly out of normal position and by interaction of coil springs 45 carried the related shifter bar 38 leftwardly also with it. This movement was effected because the eccentric face of member 57 intercepted the primary actuator and procured movement out of normal position.

The positions of the interceptors is so determined by the rotation of their shafts or axles 55—56 that always either interceptor 57 or 58 is so stationed that one of the faces points toward a member 62 or 63 and extends sufficiently in that direction that an actuation movement will occur if the associated shifter bar is in neutral position or out of the selected position. The interceptors attain their various positions by a stepped action. Each interceptor is generally in the shape of an eccentric fixed on its associated shaft 55 or 56 and has at four points on that eccentric face flattened faces so that the members 62—63 will better contact with the interceptor for the actuation movement. The eccentric relation of the interceptor to its shaft is shown in Fig. 1 where the shaft 55 associated with 57 is shown displaced to the left relative to the interceptor, and the mid-distant faces on the upper and lower sides of the interceptor 57 are shown as equi-distant from the horizontal level of the shaft 55.

In the actuation movement as the vacuum effect withdraws air from cylinder 72 and piston 70 rises, the two primary actuators are drawn toward the neutral or normal position of the interceptors, that is toward the axis of a shaft 55 or 56 in its neutral position, and in this movement will contact the faces of the interceptors drawing the interceptors toward the normal position for the selected movement by that contact and causing such compression of coil springs 45 as is necessary. Suppose that with the shifter bars and actuator bars in the position shown in Fig. 2, that interceptors are rotated so as to place them in position for engagement of another gear, in the construction or relation of gears shown, the interceptor 57 may then have turned to the position where its mid-distant faces are in the actuation line of the primary actuators and the interceptor 58 may then have turned into the position where its extreme face is in the actuation line, and therefore if the primary actuators approach the interceptors in the next actuation movement, the member 62 would contact the interceptor 57 as member 63 contacts interceptor 58 and movement of actuator bar 42 to the right and movement of the actuator bar 43 to the leftward would occur simultaneously, but this movement would not directly effect shifter bar 39 until shifter bar 38 has moved rightwardly sufficient so that the locking member 49 releases shifter bar 39 whereupon shifter bar 39 would move leftwardly under the action of its compressed coil spring 45 to the engagement position. Thus the actual shifting movement of shifter bars 38—39 is accomplished nearly as a completely unitary movement or contemporaneous movement, the movement of the one being delayed only momentarily. Thus shifter bars and actuator bars take their newly determined positions nearly instantaneously with movement of the primary actuators to their converged positions, and when so completed there is no further movement of shifter bars or actuator bars, and in the withdrawing action of the primary actuators they simply move away from contact with each of the interceptors 57 and 58, leaving the latter in their newly determined positions, until a new actuation or engagement movement is determined and effected.

In the actuation movement the neutral position of an actuator bar and its shifter bar is effected by the fact that location of such members out of neutral position causes an associated face (a mid-distant face) of interceptor related to be sufficiently out of neutral to contact the members 62 or 63 and procure the neutral positioning movement, and likewise the engagement position of an actuator bar and its shifter bar is effected by the fact that location of such members in neutral position causes an associated extreme face of the associated interceptor to be out of neutral position and in line sufficiently so that the movement to an extreme or engagement position of shifter bar and actuator bar will occur.

In the actuation for engagement a delay of movement of the piston 70 and therefor of the primary actuators as compared with the movement of piston 22 for declutching the main clutch, would occur since the vacuum effect becomes immediate through port 111 and conduit 24 on piston 22 but becomes effective on piston 70 through the restricted by-pass 125 and conduit 123.

In all shift movements, the interceptors 57, 58 are previously rotated and stationed in the position corresponding to the position for engagement of the speed appropriate for the speed at which the car is traveling, since at all times the rack 89 by the pressure of liquid oil in the cylinder 91 keeps the interceptors rotated to exactly the position for engagement of the appropriate speed whenever the operator desires such change. The pump plunger 94 is constantly actuated when the car travels, to create a pressure proportionate to the car speed, as the small vent 97 does not permit free discharge, but discharge only at a slightly increasing rate for increasing pressures. Thus pressure increases in cylinder 91. The operator may adjust the relative pressures to car speeds and thereby adjust the relative car speeds at which the steps of rotation of interceptors 57, 58 will occur by adjusting needle valve 100 (as one method) or by adjusting screw nut 105 and thereby the pressure of spring 104 as another method, or by both methods. Either of these adjustment means may be eliminated from a construction. By these adjustment means the adjustments may be made to occur automatically at different car speeds, say at speeds of 15, 20, 30 miles per hour. All changes of the position of interceptors 57, 58 are automatic, according to car speed, and therefore whenever the operator desires to cause a change to a speed gear appropriate to the rate of travel, he merely needs to permit the throttle lever 129 to partially close the gas flow and to shift the control valve 122 to its alternate position, and this he may do as often as he desires and he may delay such shift at any time by not moving control lever 122. Whenever the main clutch 13 is engaged the primary actuators are withdrawn from contacting positions and therefore there can be no change without declutching the main clutch 13.

The order of engagement may be changed by some mechanical changes without departing from the contemplation of my invention, as for instance the direct engagement may be made as the third engagement position and the fourth position may be an overdrive engagement. The clutch 127 is provided to provide for disconnection of the engine positively when the car stands still, and need not be used at all except when the car stands still. I contemplate that for obtaining reverse driving from the transmission final drive shaft 2 to the shaft 126 and thereby to any propelled elements, any of the conventional reverse driving gear trains or reverse driving means may be inserted between the shafts 2 and 126 for variably connecting the shafts 2 and 126 for such reverse driving as alternative to forward drive. The clutch 127 may be incorporated with such reverse means in any manner as commonly known. The variable transmission means herein shown would not be altered in any manner for such reverse driving as for either forward or reverse driving the drive would proceed from shaft 2, at its left end as shown in Figure 1. For such reverse driving any combination of gears and shafts commonly known and otherwise than the reverse means shown may be used and such gears and shafts would be as necessary and in addition to those shown in connection with the variable means, namely shafts 8, 3 and 2, and would have no relation to such shafts 8, 3 and 2 except to procure such reverse driving from shaft 2 at its left end to the propelled shaft 126 or any propelled element. The reverse means shown is a conventional type of reverse driving means but any other conventional reverse driving means may be used for driving in a reverse direction from driven shaft 2.

Fig. 6 shows a form of interassociation of the levers 129 and 122, and in this form lever 122 has fixed to it member 131 which is normally pulled downwardly by tension spring 130 against stop 132 to limit its motion downwardly, but it may move upwardly, the lever 122 moving downwardly whenever throttle or accelerator pedal lever 129 is permitted to assume its released position and thereupon the member 134 fixed to lever 129 presses against lever 122 and presses it downwardly to place control valve 113 in position shown in Fig. 2, so that the vacuum becomes effective in the cylinders 72 and 23. When lever 129 is pressed downwardly by foot of operator, against compression spring 133, first lever 122 is released and control valve 113 opened to atmosphere through port 121 and thereupon further depression causes opening gradually of throttle by lever 129, in the carburetor and throttle unit 118.

While I have shown particular devices and combinations of devices in the illustration of my invention I contemplate that other detailed devices and combinations of devices may be used in the realization of my invention without departing from the spirit and intention of my invention.

What I claim is:

1. In a variable transmission means, main torque elements of which one is a drive element and the other is a driven element, a transmission element carried axially with one of the main torque elements and having permanent rotary engagement therewith but axially shiftable relative thereto, other transmission elements providing in a plurality of positions of the transmission element for variable transmission between the main torque elements, and a control means comprising a motor with actuator units moving oppositely and adapted to move the transmission element either way axially in movement of the actuators toward each other and an interceptor shiftable for variable interrelation with the transmission element through the actuator units to provide interception between the transmission element and actuator units for determination of the axial movement of the transmission element.

2. In a variable transmission, main torque elements of which one is a drive element and the other is a driven element, transmission elements each carried axially with one of the main torque elements and having permanent rotary engagement therewith but axially shiftable relative thereto, other transmission elements providing in a plurality of positions of the first-named transmission elements for variable transmission between the main torque elements, and a control means comprising a power actuator with oppositely moving contactors adapted to move the first-named transmission elements one way axially and yieldable means to move them the other way axially and an interceptor means shiftable to provide variable interception of the power actuator and the first-named transmission elements to procure variable location of the first-named transmission elements according to the determination of the interceptor means.

3. In a variable transmission means, main torque elements of which one is a drive element and the other is a driven element, transmission elements each carried axially with one of the main torque elements and having permanent rotary engagement therewith but shiftable axially relative thereto, other transmission elements providing in a plurality of positions of the first-named transmission elements for variable transmission between the main torque elements, and a control means comprising a power actuator with oppositely moving contactors and a yieldable means oppositely moving said contactors, such power actuator and yieldable means adapted in one phase of movement through said contactors to move the first-named transmission elements axially into engagement positions and adapted in the opposite phase of movement to cause recession of said contactors and interceptor means actuable to control the interactuation of the control means and the first-named transmission elements.

4. In a variable transmission, main torque elements of which one is a drive element and the other is a driven element, transmission elements each carried axially with one of the main torque elements and having permanent rotary engagement therewith but shiftable axially relative thereto, other transmission means providing in a plurality of positions of the transmission elements for variable transmission between the main torque elements, and a control means comprising a power actuator with oppositely moving contactors and a yieldable means oppositely moving said contactors, such power actuator and yieldable means adapted in one phase of movement through said contactors to move the first named transmission elements axially into engagement positions and adapted in the opposite phase of movement to cause recession of said contactors and interceptor means actuable to control the interactuation of the control means and the transmission elements, and a means for control of the power actuator.

5. In a variable transmission, main torque elements of which one is a drive element and the other is a driven element, transmission elements each carried axially with one of the main torque elements and having permanent rotary engagement therewith but shiftable axially relative thereto, other transmission means providing in a plurality of positions of the transmission elements for variable transmission between the main torque elements, and a control means comprising a power actuator with oppositely moving contactors and a yieldable means oppositely moving said contactors, such power actuator and yieldable means adapted in one phase of movement through said contactors to move the first named transmission elements axially into engagement positions and adapted in the opposite phase of movement to cause recession of said contactors and interceptor means subject to determination by a control means to thereby provide variable interactuation of the first control means and the transmission elements.

6. In a variable transmission, main torque elements one of which is a drive element and the other of which is a driven element, transmission elements each carried axially with one of the main torque elements and having permanent rotary engagement therewith but axially shiftable relative thereto, other transmission means providing in a plurality of positions of the transmission elements for variable transmission between the main torque elements, and a control means comprising oppositely moving actuator units and a power actuator therefor and oppositely acting yieldable means, one of such power actuator and yieldable means being adapted to move the actuator units into transmission element actuating positions and the other adapted to remove the actuator units from the transmission element actuating positions, and interceptor means actuable to control the variable interactuation of the actuator units and the transmission elements.

7. In a variable transmission, main torque elements one of which is a drive element and the other of which is a driven element, transmission elements each carried axially with one of the main torque elements and having permanent rotary engagement therewith but shiftable axially relative thereto, other transmission means providing in a plurality of positions of the transmission elements for variable transmission between the main torque elements, and a control means comprising oppositely moving actuator units and a fluid pressure responsive motor therefor and oppositely acting yieldable means, one of such motor and yieldable means being adapted to move the actuator units into transmission element actuating positions and the other adapted to remove the actuator units from the transmission element actuating positions, and interceptor means actuable to control the variable interactuation of the actuator units and the transmission elements, and a means for alteration of the fluid pressure in the pressure responsive actuator.

8. In a variable transmission, main torque elements one of which is a drive element and the other of which is a driven element, transmission elements each carried axially with one of the main torque elements and having permanent rotary engagement therewith but shiftable axially relative thereto, other transmission means providing in a plurality of positions of the transmission elements for variable transmission between the main torque elements, and a control means comprising oppositely moving actuator units and a power actuator therefor and oppositely acting yieldable means, one of such power actuator and yieldable means being adapted to move the actuator units into transmission actuating positions and the other adapted to remove the actuator units from the transmission element actuating positions, and interceptor means actuable to control the variable interactuation of the actuator units and the transmission elements, and a means subject to determination by a control affecting the power delivery from the engine to the drive element for alteration of the actuation impulse of the power actuator.

9. In a variable transmission, main torque elements one of which is a drive element and the other of which is a driven element, transmission elements each carried axially with one of the main torque elements and having permanent rotary engagement therewith but axially shiftable relative thereto, other transmission means providing in a plurality of positions of the transmission elements for variable transmission between the main torque elements, and a control means comprising oppositely moving actuator units and a power actuator therefor and oppositely acting yieldable means, one of such power actuator and yieldable means being adapted to move the actuator units into transmission element actuating positions and the other adapted to remove the actuator units from the transmission element actuating postions, and interceptor means automatically located to control the variable interactuation of the actuator units and the transmission elements.

10. The novel means described in claim 9 in combination with a means for determination of the movement of the power actuator and control thereof.

11. The novel means described in claim 9 in combination with a means subject to determination by a manual control affecting the power delivery from the engine to the drive element for determination of the movement of the power actuator.

12. In a variable transmission means, main torque elements one of which is a drive element and the other of which is a driven element, transmission elements each carried axially with one of the main torque elements and having permanent rotary engagement therewith but axially shiftable relative thereto, a shifter element for each transmission element with which it is shiftable, other transmission means providing in a plurality of positions of the transmission elements for variable transmission between the main torque elements, and a control means comprising oppositely moving actuator units and a power actuator therefor and oppositely acting yieldable means, one of such power actuator and yieldable means being adapted to move the actuator units into shifter element actuating positions and the other adapted to remove the actuator units from the shifter element actuating positions, and interceptor means actuable to control the variable interactuation of the actuator units and the shifter elements.

13. The novel means described in claim 12 and a means for control of the power actuator and joint control of the power delivery from the engine to the drive element.

14. In a variable transmission, main torque elements one of which is a drive element, and the other of which is a driven element, transmission elements each carried axially with one of the main torque elements and having permanent rotary engagement therewith but axially shiftable relative thereto, a shifter element for each transmission element with which it is shiftable, other transmission means providing in a plurality of positions of the transmission element for variable transmission between the main torque elements, and a control means comprising oppositely moving actuator units and a pressure responsive motor therefor and oppositely acting yieldable means, one of such motor and yieldable means being adapted to move the actuator units into shifter element actuating positions and the other adapted to remove the actuator units from the shifter element actuating positions, and interceptor means actuable to control the variable interactuation of the actuator units and the shifter elements.

15. In a variable transmission means, main torque elements one of which is a drive element and the other of which is a driven element, transmission elements each carried axially with one of the main torque elements and having permanent rotary engagement therewith but axially shiftable relative thereto, a shifter element for each transmission element with which it is shiftable, other transmission means providing in a plurality of positions of the transmission elements for variable transmission between the main torque elements, and a control means comprising oppositely moving actuator units and a power actuator therefor and oppositely acting yieldable means, one of such power actuator and yieldable means being adapted to move the actuator units into shifter element actuating positions and the other adapted to remove the actuator units from the shifter element actuating positions, and interceptor means carried with each shifter element and actuable to control the variable interactuation of the actuator units and the shifter elements.

16. In a variable transmission means, main torque elements one of which is a drive element and the other of which is a driven element, transmission elements each carried axially with one of the main torque elements and having permanent rotary engagement therewith but axially shiftable relative thereto, a shifter element for each transmission element with which it is shiftable, other transmission means providing in a plurality of positions of the transmission elements for variable transmission between the main torque elements, and a control means comprising oppositely moving actuator units and a pressure responsive motor and oppositely acting yieldable means, one of such motor and yieldable means being adapted to move the actuator units into shifter element actuating positions and the other adapted to remove the actuator units from the shifter element actuating positions, and interceptor means carried with each shifter element having an eccentric or cam face and rotatable to control the variable interactuation of the actuator units and the shifter elements.

17. In a variable transmission means, main torque elements one of which is a drive element and the other of which is a driven element, transmission elements each carried axially with one of the main torque elements and having permanent rotary engagement therewith but axially shiftable relative thereto, a shifter element for each transmission element with which it is shiftable, other transmission means providing in a plurality of positions of the transmission elements for variable transmission between the main torque elements, and a control means comprising oppositely moving actuator units and a power actuator therefor and oppositely acting yieldable means, one of such power actuator and yieldable means being adapted to move the actuator units into shifter element actuating positions and the other adapted to remove the actuator units from the shifter element actuating positions, and interceptor means carried with each shifter element and having an eccentric or cam face and rotatable to control the variable interactuation of the actuator units and the shifter elements.

18. The novel means described in claim 15 and a determining means for the interceptor means to determine its interception action between the shifter elements and the actuator units.

19. In a variable transmission, main torque elements one of which is a drive element and the other of which is a driven element, transmission elements each carried axially with one of the main torque elements and having permanent rotary engagement therewith but axially shiftable relative thereto, other transmission means providing in a plurality of positions of the transmission elements for variable transmission between the main torque elements, and a control means comprising oppositely moving actuator units and an actuator motor adapted to move in opposite directions, motion in one way of which is adapted to move the actuator units into transmission element actuating positions and motion in the other way of which is adapted to remove the actuator units from the transmission element actuating positions, and interceptor means actuable to control the variable interactuation of the actuator units and the transmission elements.

20. In a variable transmission, main torque elements of which one is a drive element and the other is a driven element, a transmission element carried axially with one of the main torque elements and having permanent rotary engagement therewith but axially shiftable relative thereto, other transmission means providing in a plurality of positions of the transmission element for variable transmission between the main torque elements, and a control means comprising oppositely moving actuator units and an actuator motor therefor adapted in one movement to move the transmission element either way axially and adapted in another movement oppositely to recede and an interceptor means between the transmission element and the actuator units for determination of the axial movement of the transmission element.

21. In a variable transmission means, main torque elements one of which is a drive element and the other of which is a driven element, transmission elements each carried axially with one of the main torque elements and having permanent rotary engagement therewith but axially shiftable relative thereto, a shifter element for each transmission element with which it is shiftable, other transmission means providing in a plurality of positions of the transmission elements for variable transmission between the main torque elements, and a control means comprising oppositely moving actuator units and an actuator motor means therefor adapted in motion for one phase of movement of said motor means to move the actuator units into shifter element actuating positions and in motion for the opposite phase of movement of said motor means to remove the actuator units from the shifter element actuating positions, and interceptor means actuable to control the variable interactuation of the actuator units and the shifter elements.

22. The novel means described in claim 19 and a speed responsive means responsive to speed of the driven element and controlling the interceptor means to provide the variable interactuation according to the speed.

23. The novel means described in claim 20 and a speed responsive means responsive to speed of the driven element and controlling the interceptor means to provide variable interactuation of the interceptor means.

ADOLPHE C. PETERSON.